Jan. 14, 1958 H. PINES 2,820,074
ALKYLATION PROCESS
Filed Oct. 19, 1954
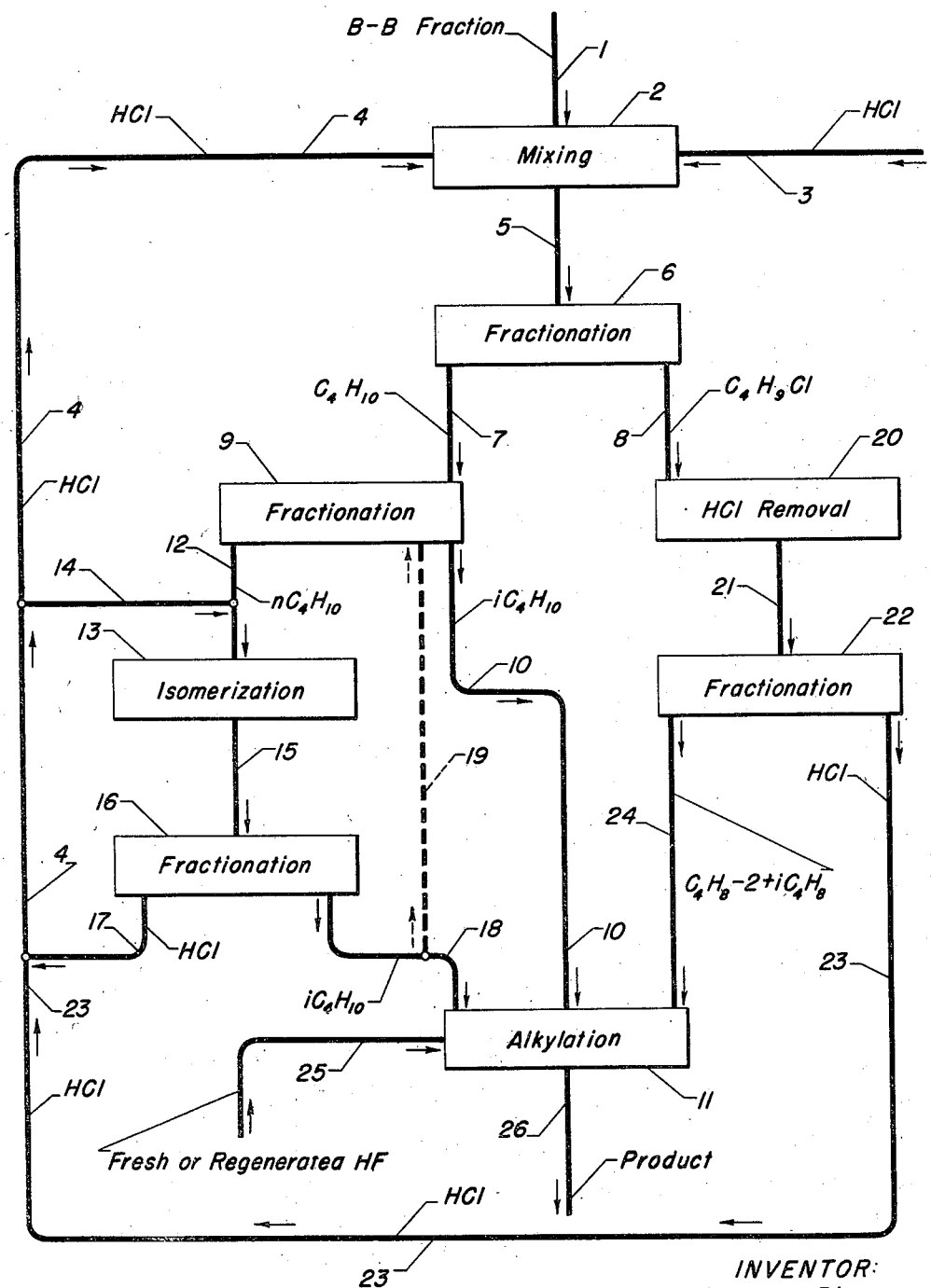
INVENTOR:
Herman Pines
By: Chester J. Giuliani
Philip T. Liggett
ATTORNEYS:

United States Patent Office 2,820,074
Patented Jan. 14, 1958

2,820,074

ALKYLATION PROCESS

Herman Pines, Evanston, Ill., assignor to Universal Oil Products Company, Des Plaines, Ill., a corporation of Delaware Application October 19, 1954, Serial No. 463,246

7 Claims. (Cl. 260—683.49)

This invention relates to an improved method for the production of substantially saturated branched-chain hydrocarbons by the alkylation of isoparaffins with olefins. It is more particularly concerned with a combination of steps whereby isobutane is alkylated with butenes to obtain hydrocarbon reaction products which are suitable for use as motor fuel and which have substantially improved antiknock characteristics as compared with the motor fuel produced according to methods taught by the prior art.

In one specific embodiment, the present invention relates to a process for producing alkylate which comprises contacting a mixture comprising normal butane, isobutane and butene with hydrogen chloride at conditions to react hydrogen chloride with said butene to form butyl chloride, separating said butyl chloride from said normal butane and said isobutane, dehydrohalogenating said butyl chloride at dehydrohalogenating conditions to remove a hydrogen chloride molecule from a butyl chloride molecule, separating the resultant hydrogen chloride from the resultant butene-2 and subjecting said butene-2 and said isobutane to alkylation.

The alkylation of isoparaffinic hydrocarbons with olefinic hydrocarbons in the presence of various condensing agents is a process which has assumed considerable importance as a method for the production of saturated hydrocarbons or hydrocarbon fractions which, because of their high octane number and high susceptibility to added tetraethyl lead, are important constituents of aviation gasoline. Catalysts such as concentrated sulfuric acid, chlorosulfonic acid, fluorosulfonic acid, phosphoric acid, aluminum chloride, etc., have been proposed for effecting this reaction. All of these prior art catalysts, however, have certain disadvantages which are not inherent in the process when hydrogen fluoride is used as the effective catalyst component.

Hydrogen fluoride catalysts are, in general, more selective, and undesirable side reactions such as polymerization, oxidation, etc. are avoided to an appreciable extent even when operating at temperatures substantially higher than are feasible with other alkylation catalysts. Moreover, the use of substantially higher operating temperatures eliminates the necessity for expensive refrigeration equipment which is required, for example, in commercial alkylation units employing sulfuric acid as a catalyst. As the hydrogen fluoride catalyst becomes contaminated with continued use, it may be regenerated readily and returned to the process for reuse. For example, regeneration may be effected by a distillation step or series of steps wherein purified hydrogen fluoride is separated from water and organic contaminants of a polymer-like nature.

Although isoparaffins, generally including the normally liquid isoparaffins such as isopentane or isohexane, may be alkylated with either normally gaseous or normally liquid olefins using a hydrogen fluoride catalyst, one of the most important applications of the process is found in the alkylation of isobutane with normally gaseous olefins, particularly the butenes. Substantial amounts of isobutane and the butenes are readily available from stabilizer overhead streams, cracking plant gas, natural gas and gasoline sources, etc. However, normal butane is usually present in the commercial sources of the mixtures of isobutane and butenes, and according to the process of my invention the normal butane is isomerized to produce the alkylatable isobutane. Further markedly different results are obtained when isobutane is alkylated with butene-1, butene-2, and isobutene particularly when using a hydrogen fluoride catalyst. Under similar operating conditions the alkylation reaction products obtained when isobutane is alkylated with either butene-2 or isobutene will have substantially higher octane numbers than the products obtained when butene-1 is employed as the olefinic reactant. In the process of the present invention substantial amounts of butene-1 are converted to butene-2 and/or isobutene.

In the process of the present invention, a feed stock containing normal butane, isobutane, and butene-1, is treated in various steps to produce a feed to the alkylation step of the process, which feed contains isobutane, butene-2, and isobutene. In the process of the present invention, the normal butane present in the original feed stock and the butene-1 present are not removed but are substantially converted to isobutane and butene-2 respectively.

The differences in product obtained when separately alkylating butene-1, butene-2 and isobutene with isobutane will be evident from the following description of experimental results obtained with the three butenes. Three experiments were conducted using a 98 weight percent hydrogen fluoride catalyst and a stirring autoclave as the reaction zone. In each run about 100 parts by weight of the hydrogen fluoride catalyst was introduced into the autoclave which was cooled in a bath of ice water. Stirring was begun and the liquid hydrocarbon charging stock was added over a period of 4 to 4.5 hours. When the addition of charging stock was complete, stirring was continued for an additional 30 minutes. The entire reaction mixture was then transferred to a copper flask cooled to −80° C. which contained 100 parts by weight of water to engage the hydrogen fluoride. This flask was connected to a trap cooled to −80° C., and towers containing soda-lime and calcium chloride were disposed between the flask and the trap. The flask was allowed to warm to room temperature and the remaining hydrocarbon liquid was washed and dried. The condensable gas was distilled under reflux to remove pentane and higher hydrocarbons which were then returned to the liquid product.

The following table of data contains the experimental results from three runs A, B, and C wherein isobutane was alkylated with butene-1, butene-2, and isobutene, respectively.

Table

| Run | A | B | C |
|---|---|---|---|
| Charge Stock, Mol Percent: | | | |
| isobutane | 77 | 76 | 78 |
| Butene-1 | 22 | 4 | 0 |
| Butene-2 | 1 | 20 | 0 |
| iso-butene | 0 | 0 | 22 |
| Conditions: | | | |
| Mol Ratio: Isobutane/butenes | 3.3 | 3.2 | 3.5 |
| Vol. Ratio: HF/Hydrocarbon | 0.16 | 0.16 | 0.16 |
| Temperature, °C | 10 | 10 | 10 |
| Contact Times, Hours [1] | 5 | 5 | 5 |
| Charge, parts by Weight: | | | |
| Isobutane | 1,742 | 1,540 | 1,816 |
| Butenes | 498 | 460 | 494 |
| Total | 2,240 | 2,000 | 2,310 |
| Recovered, parts by weight: | | | |
| Liquid (C₄ free) | 940 | 919 | 953 |
| C₅+ | 29 | 15 | 22 |
| Normal Butane | 14 | 18 | 13 |
| Isobutane | 1,140 | 982 | 1,169 |
| Loss | 117 | 66 | 153 |
| Liquid Yield, (Weight percent of butenes charged) | 194 | 203 | 197 |
| 300° F. E. P. Gasoline | 85 | 91 | 91 |
| ASTM Octane Number | 92.7 | 95.3 | 96.7 |
| Weight Percent Fluorine | .0086 | .0009 | .0001 |
| Percent 2,2,4-Trimethylpentane in Total Alkylate | 38 | 42 | 58 |

[1] Time elapsed from beginning of addition of charging stock until product removed from reactor.

A comparison of these results indicates that the alkylate produced in run A using butene-1 is definitely inferior as evidenced by the lower octane number of the aviation cut, the lower amount of "iso-octane" (2,2,4-trimethylpentane), and the substantially higher combined fluorine content. In run B using butene-2 the yield and properties of the aviation fraction of the alkylate are considerably improved. In run C using isobutene the octane number and fluorine content of the product are somewhat better than the results of run B.

In my invention the butene in the original charge stock is separated from the butanes and is subjected to a preliminary isomerization in a combination step wherein substantial amounts of butene-1 are converted to butene-2. It may also be desirable, depending upon the alkylation catalyst and operating conditions, to convert a portion of the butene-1 to isobutene. Moreover, any butene-2 which is present may also be converted to isobutene. When hydrogen fluoride is employed as the alkylation catalyst, the important objective will be to reduce the butene-1 content of the butene by converting this less desirable olefin to either of the other two isomers which, in accordance with my discovery, will produce alkylates of higher quality. Further, my invention involves a unique method of separating the butene from butane in combination with the isomerization of butene.

The accompanying drawing is a schematic flow diagram of one method of conducting my process although obviously it is not intended to limit the invention thereby.

A fraction containing appreciable quantities of normal butane, isobutane and butene-1 is introduced through line 1 to mixing zone 2. Hydrogen chloride is also introduced into mixing zone 2 through line 3 and/or hydrogen chloride may also be introduced into mixing zone 2 through recycle line 4 as will hereinafter be further explained in detail. This zone is maintained at conditions to react a substantial portion of the butenes present in the charge with the hydrogen chloride to form butyl chloride. The zone of contacting the charge with the hydrogen chloride may be merely a length of pipe or it may be a reaction vessel. It is within the scope of this invention to use catalysts in zone 2 to speed the hydrohalogenation of the olefin. Gaseous hydrogen chloride may be introduced through line 3 or an aqueous solution of the same may be used. The mixture is withdrawn from zone 2 through conduit 5 and introduced to fractionation or separation zone 6.

In fractionation zone 6 the butyl chlorides are separated from the butanes. Normally it is very difficult to separate butenes from butanes because of their close boiling points and an elaborate and expensive fractionator must be used. In my process the butenes are first substantially converted to alkyl chlorides which are much higher boiling than the butenes and the butanes, and therefore, the separation of the butyl chlorides is relatively easy. Further the hydrohalogenation of the butenes in the feed, particularly butene-1 is a step in the conversion of butene-1 into butene-2. The butanes are, therefore, separated as an overhead fraction from fractionator 6 and are withdrawn through line 7 and the butyl chlorides are withdrawn lower in the column through line 8. The butanes in line 7 will usually comprise a mixture of normal butane and isobutane and according to my invention the normal butane is separated from the isobutane and the normal butane is isomerized to isobutane. As shown in the flow diagram the butanes in line 7 are introduced into separation zone or fractionation zone 9 wherein the isobutane is separated from the normal butane. The isobutane is usually separated as an overhead fraction and is indicated as being withdrawn from fractionation zone 9 through line 10 and introduced to alkylation zone 11. The normal butane is withdrawn further down in the column, or as a bottoms product and is indicated as being removed through line 12. The normal butane in line 12 is introduced to isomerization zone 13 wherein the normal butane is substantially converted to isobutane.

The isomerization zone 13 is maintained at isomerizing conditions and an isomerization catalyst may also be used in the process. Catalysts commonly used in the isomerization process include aluminum chloride, zirconium chloride, copper chloride, zinc chloride, and iron chloride. These catalysts are not necessarily equivalent and in some cases are effective principally in combination with other members of the group. For example, it has been found that aluminum chloride alone or in combination with any of the other four metal chlorides above mentioned constitutes an effective isomerization catalyst. The isomerization is also preferably conducted in the presence of hydrogen chloride and the normal butane removed from fractionation zone 9 by way of line 12 is commingled with anhydrous hydrogen chloride supplied by way of line 14. In some cases hydrogen may also be introduced into isomerization zone 13, however, this is not an integral part of the invention and, therefore, the introduction of hydrogen is not shown. When hydrogen is used in the isomerization zone, the amount of hydrogen introduced is usually from about 0.5 to 5 mol percent of the butane. The amount of anhydrous hydrogen chloride commonly used varies from about 2 to about 20 mol percent of the charging stock. The isomerization zone is maintained at isomerizing conditions and as hereinbefore mentioned may have deposited therein an anhydrous aluminum chloride catalyst usually on an inert support and often commingled with other chlorides previously mentioned, such as zirconium chloride. Temperatures of isomerization lie within the range of from about 50° C. to about 350° C.; pressures from about 1 to about 200 atmospheres and preferably from about 5 to about 50 atmospheres at temperatures of 100° C. and higher. The products from isomerization zone 13 are withdrawn through line 15 and introduced to a separation or fractionation zone 16. In fractionation zone 16 the products lighter than butanes are removed by way of line 17 and may be recycled to zone 13 when desired. It usually will be found economical to recover the hydrogen and hydrogen chloride in these residual gases. This may be done by methods well known in the art. Such methods are not shown in the flow diagram as they do not constitute an integral part of the present invention. In the figure isobutane is indicated as being withdrawn from fractionation zone 16 through line 18. Not all of the normal butane will be isomerized to isobutane in isomerization zone 13 and therefore line 18 will also contain normal butane. Although not shown, separation zone 16 may also include a separation process for separating normal butane and isobutane. The normal butane may be recycled to isomerization zone 13 and the isobutane is passed to alkylation zone 11. The separation of the normal and isobutanes in line 18 may be accomplished by sending the mixture back to fractionation zone 9. This embodiment is illustrated by dotted line 19.

Going back to fractionation zone 6, the butyl chlorides in line 8 are passed into zone 20 which is maintained at dehydrohalogenation conditions and may have a suitable dehydrohalogenation catalyst such as alumina, bauxite, aluminum sulfate, etc. therein. During the dehydrohalogenation the hydrogen and chlorine are removed from adjacent carbon atoms such that substantial amounts of butene-2 and isobutene are formed. Therefore, starting with a charge that has substantial amounts of butene-1 therein, in my process these are converted to butene-2 and isobutene. The mixture of hydrogen chloride and butenes is withdrawn from zone 20 through line 21 and is passed into separation or fractionation zone 22 wherein the hydrogen chloride is fractionated out and withdrawn through line 23 while the butenes are withdrawn through line 24 and introduced to alkylation zone 11.

The hydrogen chloride in line 23 and the hydrogen chloride in line 17 may be combined in line 4 with a portion of the mixture recycling to isomerization zone 13 through line 14 and a portion recycling to hydrohalogenation zone 2 through line 4.

Isobutane, isobutene, and butene-2 are accordingly introduced to alkylation zone 11. Alkylation zone 11 is preferably a mixing or agitation zone, and fresh or regenerated catalyst which in this illustration comprises hydrogen fluoride is introduced through line 25. The product from the alkylation zone 11 is withdrawn through line 26. The alkylate may be separated from the mixture and unreacted materials such as isobutane and butenes may be recycled to alkylation zone 11 and also hydrogen fluoride may be recycled to the alkylation zone.

The hydrogen fluoride alkylation process as conducted in zone 11 is ordinarily carried out at a temperature of from about 0 to about 100° C., although in certain cases it may be desirable to exceed this range in either direction. The pressure in the alkylation zone is usually maintained sufficiently high to insure substantially liquid phase operation, e. g., from about 6 to about 12 atmospheres. The time factor in the process may be measured by the "space time" which is defined as the volume of liquid catalyst in the reaction zone divided by the feed rate of hydrocarbon reactants in volumes of liquid per minute. A space time of from about 5 to about 80 minutes will ordinarily be employed. As is well-known in the alkylation art, it is desirable to maintain a relatively large excess of isoparaffins over olefins in the combined feed to the alkylation zone. For example, the isoparaffin to olefin ratio may be from about 2:1 to about 25:1 or higher.

The term hydrogen fluoride catalyst as used throughout this specification and in the appended claims is intended to include any catalyst whose essential active ingredient is hydrogen fluoride. Thus the hydrogen fluoride catalyst may contain as much as from about 10 to about 15% water. Excessive dilution with water, however, results in a weakening of the alkylating activity of the catalyst. It is also within the scope of my invention to have present relatively minor amounts of promoters such as boron trifluoride.

I claim as my invention:

1. A process for producing alkylate which comprises contacting a mixture comprising normal butane, isobutane and butene-1 with hydrogen chloride at conditions to react hydrogen chloride with said butene-1 to form butyl chloride, separating said butyl chloride from said normal butane and said isobutane, dehydrohalogenating said butyl chloride at dehydrohalogenating conditions to remove a hydrogen chloride molecule from a butyl chloride molecule, separating the resultant hydrogen chloride from the resultant butene-2 and subjecting said butene-2 and said isobutane to alkylation.

2. A process for producing alkylate which comprises contacting a mixture of normal butane, isobutane, and butene-1 with hydrogen chloride at conditions to react hydrogen chloride with said butene-1 to form butyl chloride, separating said butyl chloride from said normal butane and said isobutane, separating the normal butane from the isobutane, dehydrohalogenating said butyl chloride at dehydrohalogenating conditions to remove a hydrogen chloride molecule from a butyl chloride molecule, separating the resultant hydrogen chloride from the resultant butene-2 and subjecting said butene-2 and the separated isobutane to alkylation.

3. A process for producing motor fuel which comprises contacting a mixture comprising normal butane, isobutane, and butene-1 with hydrogen chloride at conditions to react hydrogen chloride with said butene to form butyl chloride, separating said butyl chloride from said normal butane and said isobutane, separating the normal butane from the isobutane, isomerizing said normal butane in an isomerization zone at isomerizing conditions to form isobutane, dehydrohalogenating said butyl chloride at dehydrohalogenating conditions to remove a hydrogen chloride molecule from a butyl chloride molecule, separating the resultant hydrogen chloride from the resultant butene-2, and subjecting said butene-2, the separated isobutane and the isobutane obtained from the isomerization or normal butane to alkylation at a temperature of from about 0° C. to about 100° C.

4. A process for the production of motor fuel which comprises contacting a mixture comprising normal butane and butene-1 with hydrogen chloride at conditions to react hydrogen chloride with said butene to form butyl chloride, separating said butyl chloride from said butane, subjecting said butane to isomerization in the presence of catalyst comprising aluminum chloride to form isobutane, dehydrohalogenating said butyl chloride at dehydrohalogenating conditions in the presence of alumina to remove a hydrogen chloride molecule from a butyl chloride molecule, fractionating the resultant hydrogen chloride from the resultant butene-2 and subjecting said butene-2 and the formed isobutene to alkylation, at a temperature of from about 0° C. to about 100° C.

5. A process for producing motor fuel which comprises contacting a mixture comprising normal butane, isobutane, and butene-1 with hydrogen chloride at conditions to react hydrogen chloride with said butene-1 to form butyl chloride, separating said butyl chloride from said normal butane and said isobutane, separating the normal butane from the isobutane, isomerizing said normal butane in an isomerization zone at isomerizing conditions in the presence of aluminum chloride catalyst and anhydrous hydrogen chloride to form isobutane, dehydrohalogenating said butyl chloride at dehydrohalogenating conditions to remove a hydrogen chloride molecule from a butyl chloride molecule, fractionating the resultant hydrogen chloride from the resultant butene-2, and subjecting said butene-2, the separated isobutane and the formed isobutane to alkylation in the presence of substantially anhydrous hydrofluoric acid at a temperature of from about 0° C. to about 100° C.

6. A process for producing more valuable products from a hydrocarbon mixture containing normal butane and butene-1, which comprises commingling hydrogen chloride with said mixture and reacting the same with the butene-1 to form butyl chloride, separating the latter from the normal butane and dehydrohalogenating said butyl chloride to form butene-2, isomerizing the normal butane to form isobutane therefrom, and alkylating said isobutane with said butene-2.

7. The process of claim 6 further characterized in that the normal butane is isomerized in the presence of aluminum chloride catalyst and in that hydrogen chloride liberated from the butyl chloride by the dehydrohalogenation thereof is supplied to the butane isomerizing step.

References Cited in the file of this patent

UNITED STATES PATENTS

| | | |
|---|---|---|
| 2,351,609 | Haensel | June 20, 1944 |
| 2,366,716 | Frey | Jan. 9, 1945 |
| 2,379,731 | McAllister | July 3, 1945 |
| 2,396,486 | Ballard | Mar. 12, 1946 |
| 2,403,439 | Ipatieff et al. | July 9, 1946 |
| 2,428,417 | Gary | Nov. 26, 1947 |
| 2,456,672 | Bloch et al. | Dec. 21, 1948 |
| 2,591,367 | McAllister | Apr. 1, 1952 |